(12) United States Patent
Moens et al.

(10) Patent No.: US 11,680,608 B2
(45) Date of Patent: Jun. 20, 2023

(54) POWER FLOW IN A DOUBLE CONCENTRIC CLUTCH

(71) Applicant: TRANSMISIONES Y EQUIPOS MECANICOS, S.A. DE CV, Zedelgem (BE)

(72) Inventors: Ilse Moens, Bruges (BE); Jannick De Landtsheere, Sint-Kruis (BE); Didier Genouw, Eernegem (BE)

(73) Assignee: TRANSMISIONES Y EQUIPOS MECANICOS, S.A. DE CV (BE)

( * ) Notice: Subject to any disclaimer, the term of this patent is extended or adjusted under 35 U.S.C. 154(b) by 46 days.

(21) Appl. No.: 17/611,107

(22) PCT Filed: May 13, 2020

(86) PCT No.: PCT/EP2020/063309
§ 371 (c)(1),
(2) Date: Nov. 12, 2021

(87) PCT Pub. No.: WO2020/234081
PCT Pub. Date: Nov. 26, 2020

(65) Prior Publication Data
US 2022/0243774 A1    Aug. 4, 2022

(30) Foreign Application Priority Data

May 17, 2019 (EP) .................................. 19175037

(51) Int. Cl.
*F16D 25/10* (2006.01)
*F16D 25/0638* (2006.01)
(Continued)

(52) U.S. Cl.
CPC ......... *F16D 25/10* (2013.01); *F16D 25/0638* (2013.01); *F16D 25/123* (2013.01);
(Continued)

(58) Field of Classification Search
CPC ................. F16D 25/10; F16D 25/0638; F16D 2021/0661; F16D 2300/17; F16D 2300/12; F16H 1/36
See application file for complete search history.

(56) References Cited

U.S. PATENT DOCUMENTS

| 8,479,906 B2 * | 7/2013 | Hauck ................. F16D 25/0638 |
| | | 192/115 |
| 8,672,109 B2 | 3/2014 | Quartier et al. ........ F16D 21/06 |

(Continued)

FOREIGN PATENT DOCUMENTS

| DE | 1226992 | 7/2002 | ............. B60K 17/02 |
| DE | 10 2005 045 158 | 3/2007 | ............. F16D 21/02 |

(Continued)

OTHER PUBLICATIONS

U.S. Appl. No. 17/611,011, filed Nov. 12, 2021.
(Continued)

*Primary Examiner* — Stacey A Fluhart
(74) *Attorney, Agent, or Firm* — Hayes Soloway P.C.

(57) ABSTRACT

Disclosed is a double concentric clutch for a transmission having a power flow to both clutches that extends around an outer drive drum, and for an inner via an oil distributor. Parts are assembled using splines, and axial movements are limited using retaining rings which increases ease of assembly and disassembly.

20 Claims, 4 Drawing Sheets

(51) Int. Cl.
*F16D 25/12* (2006.01)
*F16D 21/06* (2006.01)

(52) U.S. Cl.
CPC ............... *F16D 2021/0607* (2013.01); *F16D 2021/0661* (2013.01)

(56) References Cited

U.S. PATENT DOCUMENTS

| | | | |
|---|---|---|---|
| 2005/0067251 A1* | 3/2005 | Braford | F16D 25/123 192/48.8 |
| 2009/0000896 A1* | 1/2009 | Knowles | F16D 25/0638 903/902 |
| 2012/0085615 A1* | 4/2012 | Noehl | F16D 25/0638 192/48.1 |

FOREIGN PATENT DOCUMENTS

| | | | |
|---|---|---|---|
| DE | 10 2009 059 928 | 7/2010 | ............. F16D 13/72 |
| KR | 20160016659 A * | 2/2016 | ........... F16D 25/123 |
| WO | WO2018104396 | 6/2018 | ............. F16D 21/06 |

OTHER PUBLICATIONS

International Preliminary Report on Patentability issued in PCT/EP2020/063309, dated Nov. 16, 2021, 7 pages.
International Search Report and Written Opinion issued in PCT/EP2020/063309, dated Jul. 13, 2020, 10 pages.
International Preliminary Report on Patentability issued in PCT/EP2020/063315, dated Nov. 16, 2021, 10 pages.
International Search Report and Written Opinion issued in PCT/EP2020/063315, dated Jul. 13, 2020, 10 pages.

* cited by examiner

POWER FLOW IN A DOUBLE CONCENTRIC CLUTCH

FIELD OF THE INVENTION

The invention relates to double concentric clutch for automotive applications.

BACKGROUND

In general, double clutches are used in DCTs (double clutch transmissions) to transfer power (speed and torque) from an engine and flywheel to the gearbox. Clutch outputs to the gearbox are typically two concentric shafts where one is used for the odd gears and one for the even and reverse gears. Both power flow paths can be controlled separately by one of the two clutches in the double clutch. Both clutches are actuated separately by hydraulic pressure and can be open, slipping (with differential speed over the clutch) or closed (no differential speed).

Space for a double clutch assembly is often limited in a sports car transaxle DCT where the axial packaging space is limited. This axial space is determined by the position of engine and flywheel with respect to the side shafts (wheels) and is an input for the design given by the customer. The limited axial packaging space forces the usage of two concentric clutches of which the inner clutch is used for the even gears (and reverse) and the outer clutch for the odd gears. For the high end sports car application, a multi-plate clutch is used that is actively cooled by forced oil lubrication. Oil distribution into and through the clutches plates relies in part on centrifugal forces. In a double clutch assembly oil is distributed centrifugally through the rotating parts of the rotating clutch pack, however, when the vehicle is at standstill, the clutch output is also stationary leading to a loss of oil distribution.

A problem is how to ensure that oil is distributed through both clutch pack during operation. The dimensioning of the clutches is dependent on the torque requirements and the thermal loads of the slipping clutches in manoeuvres specified by the customer. Ease of assembly and disassembly of a double clutch are factors for cost of manufacture and service; it is a goal to reduce the number of manufacturing steps while maintaining performance and reliability.

D1 (DE 10 2005 045158 A1) discloses a dual clutch assembly having an axial support device for axial support and positioning of both clutch packs and pistons.

The present invention relates to provision of solutions that reduce the packaging space, improve oil distribution, reduce assembly costs and complexity without foregoing performance.

SUMMARY OF THE INVENTION

In a first aspect provided herein is a double clutch unit (100) for a transmission, having an engine side (E) and a gearbox side (G) comprising:
a clutch unit input hub (1),
a clutch unit outer output hub (17) and an clutch unit inner output hub (8) concentrically arranged,
an outer clutch pack (40) and an inner clutch pack (30), each having a clutch pack input side (42, 32) and a clutch pack output side (44, 34),
wherein
the outer clutch pack output side (44) is rotationally fixed to the clutch unit inner output hub (8); and
the inner clutch pack output side (34) rotationally fixed to the clutch unit outer output hub (17);
a drive plate (2) disposed on the engine side of both clutch packs (30, 40) rotationally fixed to the clutch unit input hub (1);
an oil distributor (9) is disposed concentrically between the inner clutch pack (30) and the clutch unit outer output hub (17);
a drive drum (3), having
a hollow peripheral cylindrical part (3a) extending axially over the outer clutch pack (40), and
a side face (3b) extending over the gearbox side of both clutch packs (30, 40) to the oil distributor (9) and rotationally fixed the hollow peripheral cylindrical part (3a),
an inner clutch end plate (10) is rotationally fixed to the oil distributor (9) and to the inner clutch input side (32);
which drive plate (2), drive drum (3), oil distributor (9), and inner clutch end plate (10) are mutually rotationally fixed;
wherein torque is transferred from the clutch unit input hub (1) to the outer clutch pack input side (42) via a power flow path from the input hub (1), to drive plate (2), to drive drum (3) to outer clutch pack input side (42),
wherein torque is transferred from the clutch unit input hub (1) to the inner clutch pack input side (32) via a power flow path from the input hub (1), to drive plate (2), to drive drum (3), to oil distributor, to inner clutch end plate (10), to inner clutch pack input side (32)
wherein,
the outer clutch pack input side (42) is oriented peripheral to the outer clutch pack output side (44), and
the inner clutch pack output side (34) is oriented peripheral to the inner clutch pack input side (32).

The double clutch unit (100) may further comprise:
an inner clutch pack piston (38) for controllable actuation of the inner clutch pack (30),
an outer clutch pack piston (48) for controllable actuation of the outer clutch pack (40),
wherein the side face (3b) of the drive drum (3) is disposed at gearbox side (G) of both the inner clutch pack piston (38) and outer clutch pack piston (48), and/or
wherein the inner clutch pack piston (38) is disposed on the engine side (E) of the outer clutch pack piston (48).

The outer clutch pack piston (48) may be axially slidable responsive to expansion or contraction of an outer clutch pack pressure chamber (46), and
the outer clutch pack pressure chamber (46) may be defined by a sliding chamber part (45) of the outer clutch pack piston (48) and an axially stationary part (3b') formed in the side face (3b) of the drive drum (3). The sliding chamber part (45) may be sealed against the axially stationary part (3b') by an annular seal (55) disposed, optionally in a groove, around the sliding chamber part (45).

The double clutch unit (100) may further comprise an outer clutch pack piston hydraulic balancing chamber (47) wherein:
the outer clutch pack piston hydraulic balancing chamber (47) is defined by the sliding chamber part (45) of the outer clutch pack piston (48) and an axially stationary part (23);
hydraulic fluid is provided to the outer clutch pack piston hydraulic balancing chamber (47) to counter a build-up of hydraulic pressure caused by centrifugal forces acting in the outer clutch pack piston pressure chamber (46) to close the outer clutch pack (40);

optionally the outer clutch pack piston hydraulic balancing chamber (47) comprises a spring pack (20) to bias the outer clutch pack piston hydraulic balancing chamber (47) in an open position.

The inner clutch pack piston (38) may be axially slidable responsive to expansion or contraction of an inner clutch pack pressure chamber (36), and the inner clutch pack pressure chamber (36) may be defined by a sliding chamber part (35) of the inner clutch pack piston (38) and an axially stationary part (24).

The double clutch unit (100) may further comprise an inner clutch pack piston hydraulic balancing chamber (37) wherein:

the inner clutch pack piston hydraulic balancing chamber (37) is defined by the sliding chamber part (35) of the inner clutch pack piston (38) and an axially stationary part (12), hydraulic fluid is provided to the inner clutch pack piston hydraulic balancing chamber (37) to counter a build-up of hydraulic pressure caused by centrifugal forces acting in the inner clutch pack piston pressure chamber (36) to close the inner clutch pack (30).

The double clutch unit (100) may further comprise a split ring (27) axially fixed around the oil distributor (9) between the stationary part (24) of the inner clutch pack pressure chamber (36) and the stationary part (23) of the outer clutch pack piston hydraulic balancing chamber (47) configured to limit:

an axial sliding motion of the stationary part (24) of the inner clutch pack pressure chamber (36), and an axial sliding motion of the stationary part (23) of the outer clutch pack piston hydraulic balancing chamber (47).

At least one clutch pack (30, 40) may comprise one or more springs, preferably wave springs (5) and/or disk springs (15), configured to maintain clutch plates within the clutch pack (30, 40) separated such that the clutch pack (30, 40) is biased in a disengaged state to reduce drag torque in open clutch.

The drive plate (2) may be dismountably attached to the drive drum (3) by a spline connection, and by an engine side retaining ring (31a) and by a gearbox side retaining ring (31b) each retaining ring (31a, 31b) dismountably attached to the drive drum (3) to limit axial movement of the drive plate (2).

The drive plate (2) may be configured as an engine side end stop for the outer clutch pack (40) that receives axial forces applied by the outer clutch pack piston plate (48) to compress the outer clutch pack (40)).

The double clutch unit (100) may further comprising an outer clutch output drum (7) configured to rotationally attach and fix the outer clutch pack output side (44) to the clutch unit inner output hub (8) by one or more spline connections to the outer clutch pack output side (44) and by a welded connection to the clutch unit inner output hub (8).

The double clutch unit (100) may further comprise an inner clutch output drum (16) configured to rotationally attach and fix the inner clutch pack output side (34) to the clutch unit outer output hub (17) by one or more spline connections to the inner clutch pack output side (34) and by a welded connection to the clutch unit outer output hub (17).

The inner clutch end plate (10) may be attached to:

the oil distributor (9) by one or more spline connections, and the inner clutch pack input side (32) by one or more spline connections.

Preferred embodiments of the invention are disclosed in the detailed description and appended claims. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous. (Preferred) embodiments of one aspect of the invention are also (preferred) embodiments of all other aspects of the invention.

DETAILED DESCRIPTION

When describing the invention, the terms used are to be construed in accordance with the following definitions, unless a context dictates otherwise.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art.

As used in the specification and the appended claims, the singular forms "a", "an," and "the" include plural referents unless the context clearly dictates otherwise.

Unless defined otherwise, all technical and scientific terms used herein have the same meaning as is commonly understood by one of skill in the art. All publications referenced herein are incorporated by reference thereto.

Throughout this application, the term 'about' is used to indicate that a value includes the standard deviation of error for the device or method being employed to determine the value. The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the end point values themselves (e.g. from 1.0 to 5.0 includes both 1.0 and 5.0). Any numerical range recited herein is intended to include all sub-ranges subsumed therein.

A peripheral orientation is in a direction away from the central axis of the clutch unit. A central axis is co-axial with a central axis of the clutch unit outer output hub (17) and clutch unit inner output hub (8). An engine side (E) is closer to the connecting engine/flywheel. A gearbox side (G) is closer to the connecting gearbox. Axially fixed refers to parts where relative sliding in an axial direction is prevented (e.g. by a stop member or snap ring, weld). Rotationally fixed refers to parts where rotation is prevented (e.g. by a spline, weld). Seals described herein are provided between parts having a peripheral-central (e.g. concentric) relative arrangement. They typically restrict movement of fluid (e.g. lubricant) in an axial direction past the seal.

In order to achieve sufficient space for the required number and size of friction plates and at the same time meet the requirements for the clutch control in a sports car application, a specific clutch lay-out was developed wherein the power flow path for the inner clutch is through the oil distributor.

Figure 1:
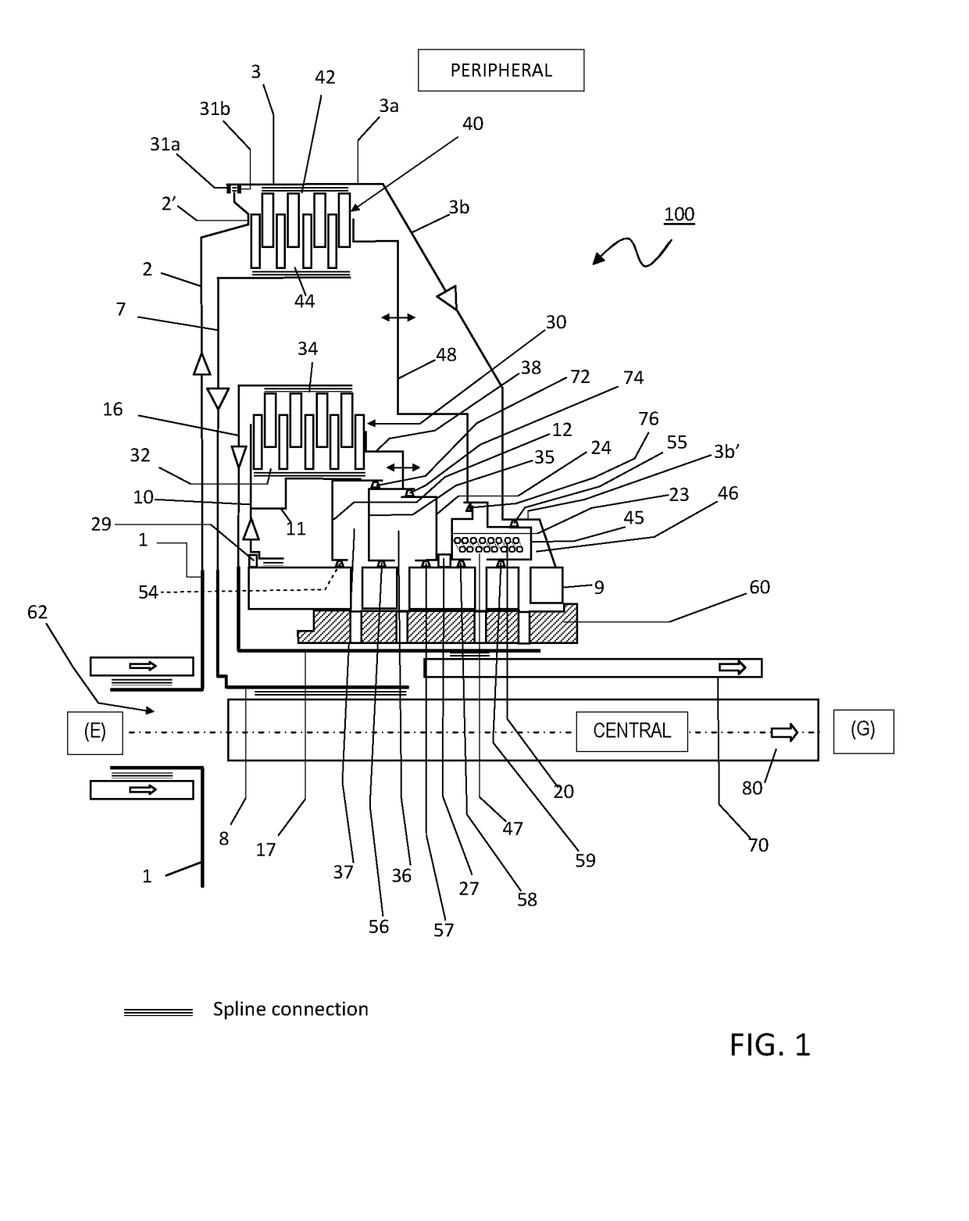
FIG. 1 provides a schematic overview of the layout of a double clutch unit (100) for a transmission as described herein. Shown is an axial cross section and the upper half; the lower half is a mirror image. Arrows indicate the flow of power. Fine parallel lines indicate a spline connection.

Provided here is a double clutch unit (100) for a transmission (see for instance FIG. 1), having an engine side (E) and a gearbox side (G) comprising:
  a clutch unit input hub (1),
  a clutch unit outer output hub (17) and an clutch unit inner output hub (8),
  an outer clutch pack (40) and an inner clutch pack (30), each having a clutch pack input side (42, 32) and a clutch pack output side (44, 34),
  wherein
    the outer clutch pack output side (44) is rotationally fixed (at the engine side) to the clutch unit inner output hub (8) (by an outer clutch output drum (7)); and
    the inner clutch pack output side (34) rotationally fixed (at the engine side) to the clutch unit outer output hub (17) (by an inner clutch output drum (16)).

A hub as described herein comprises a hollow central cylindrical part disposed with an internal or external spline connector on an inside or outside surface respectively, and a flange part rotationally and axially attached and fixed to the hollow cylindrical part (e.g. by weld or bolt). The flange projects outwards from the hollow cylindrical part. Torque is transmitted via the hub to parts of the double clutch unit (100) that are concentrically arranged and radially distant. The flange is typically annular, attaching to an edge of the hollow cylindrical part. The flange may or may not be flat, it may be a continuous or discontinuous circle. The flange may be plate like.

A drum as described herein comprises a hollow peripheral cylindrical part disposed with an internal or external spline connector on an inside or outside surface of the hollow peripheral cylindrical part respectively, and a side face rotationally and axially attached and fixed to the hollow cylindrical part (e.g. by weld or bolt). The hollow cylindrical part is disposed on a periphery of the drum. The side face projects inwards from the peripheral cylindrical part towards a central axis of rotation of the drum. Torque is transmitted via the drum to parts of the double clutch unit (100) that are concentrically arranged and radially distant. The side face is typically circular, attaching at its outer circumference to an edge of the peripheral cylindrical part. The side face may or may not be flat, it may be a continuous or discontinuous circle.

The clutch unit input hub (1) comprises a hollow central cylindrical part disposed with an external spline connector for attachment to a power input shaft and a flange part rotationally fixed and attached to the cylindrical part. The clutch unit input hub (1) is rotationally fixed to the outer clutch pack input (42) and the inner clutch pack input side (32). The flange part of the clutch unit input hub (1) may be attached to a drive plate (2) (e.g. by welding), which is rotationally fixed to outer clutch pack input side (42) and the inner clutch pack input side (32).

The clutch unit inner output hub (8) comprises a hollow central cylindrical part disposed with an internal spline connector for attachment to an inner power output shaft (80), and a flange part attached in fixed rotational relation to the outer clutch pack output side (44). The clutch unit inner output hub (8) may be attached to the outer clutch pack output side (44) via an outer clutch output drum (7) and external spline connection as shown, for instance, in FIG. 1. The clutch unit inner output hub (8) and the outer clutch output drum (7) may be mutually attached by a welded connection.

The clutch unit outer output hub (17) comprises a hollow central cylindrical part disposed with an internal spline connector for attachment to an outer power output shaft (70), and a flange part attached in fixed rotational relation to an inner clutch pack output side (34). The clutch unit outer output hub (17) may be attached to the inner clutch pack output side (34) via an inner clutch output plate (16) and an internal spline connection as shown, for instance, in FIG. 1. The clutch unit outer output hub (17) and inner clutch output plate (16) may be mutually attached by a welded connection.

The cylindrical parts of both clutch unit outer output hub (17) and clutch unit inner output hub (8) are concentrically arranged. Both clutch unit outer power output shaft (70) and clutch unit inner power output shaft (80) are concentrically arranged. Both outer clutch pack (40) and an inner clutch pack (30) are concentrically arranged.

By concentrically arranged, it is meant that the parts are co-axial and at least partly overlap at an axial position. For instance, an outer part may surround circumferentially an inner part, and either an outer part covers at least partially, preferably entirely, an axial span of the inner part, or an inner part extends at least partially, preferably entirely, axially outwards from the outer part at one or both ends.

The double clutch unit (100) comprises the drive plate (2) disposed on the engine side of both clutch packs (30, 40) rotationally fixed to the clutch unit input hub (1). The drive plate may be circular.

The double clutch unit (100) further comprises an oil distributor (9) disposed concentrically between the inner clutch pack (30) and the clutch unit outer output hub (17). The oil distributor (9) may be cylindrical.

The double clutch unit (100) further comprises a drive drum (3), having:
  a hollow peripheral cylindrical part (3a) extending axially over the outer clutch pack (40), and
  a side face (3b) extending over the gearbox side of both clutch packs (30, 40) to the oil distributor (9). The hollow peripheral cylindrical part (3a) extends axially over the outside of the outer clutch pack (40). The side face (3b) is rotationally (and axially) fixed the hollow peripheral cylindrical part (3a).

The drive drum (3) may be rotationally fixed to the outer clutch pack input side (42) via a spline connection. The drive drum (3) may be rotationally fixed to the oil distributor by a weld. The spline connection is preferably by way of an internal spline connector on the inner surface of the hollow peripheral cylindrical part of the drum, and the weld connection is to the side face of the drum.

The double clutch unit (100) further comprises an inner clutch end (input) plate (10) that is rotationally fixed (at the engine side) to the oil distributor (9) and to the inner clutch input side (32). An inner clutch end plate (10) may be rotationally fixed to the oil distributor (9) at an axial position that is at the engine side of the oil distributor (9). An inner clutch drum (11) extending in an axial direction towards the gearbox side (G) may be rotationally fixed (e.g. by welding) to the inner clutch end (input) plate (10). An external spline may be disposed on the inner clutch drum (11), for connection to the inner clutch input side (32).

The drive plate (2), drive drum (3), oil distributor (9), and inner clutch end plate (10) are mutually rotationally fixed.

Torque is transferred from the clutch unit input hub (1) to the outer clutch pack input side (42) via a power flow path from the input hub (1), to drive plate (2), to drive drum (3) to outer clutch pack input side (42).

Torque is transferred from the clutch unit input hub (1) to the inner clutch pack input side (32) via a power flow path the input hub (1), to drive plate (2), to drive drum (3), to oil distributor, to inner clutch end plate (10), to inner clutch pack input side (32).

It is appreciated that a transmission is for a transport vehicle.

A clutch unit outer output hub (17) may be attached in fixed rotation to a clutch unit outer power output shaft (70); they may be connected using a spline connection. The clutch unit outer power output shaft (70) outputs torque to the next stage of the drive train e.g. to the gearbox.

A clutch unit inner output hub (8) may be attached in fixed rotation to a clutch unit inner power output shaft (80); they may be connected using a spline connection. The clutch unit inner power output shaft (80) outputs torque to the next stage of the drive train e.g. to the gearbox. The clutch unit input hub (1) may be connected to the engine/flywheel using a spline connection. The clutch unit input hub (1) may be connected to the drive plate (2) using a welded connection.

An outer clutch output drum (7) may be employed to rotationally attach and fix the outer clutch pack output side (44) to the clutch unit inner output hub (8). The attachment to the outer clutch pack output side (44) may be via a spline connection. The attachment to the clutch unit inner output hub (8) may be by a weld. The spline connection is preferably by way of an external spline connector on the outside surface of the hollow peripheral cylindrical part of the drum, and the weld connection is to the side face of the drum.

An inner clutch output drum (16) may be employed to rotationally attach and fix the inner clutch pack output side (34) to the clutch unit outer output hub (17). The attachment to the inner clutch pack output side (34) may be via a spline connection. The attachment to the clutch unit outer output hub (17) may be by a weld. The spline connection is preferably by way of an internal spline connector on the inside surface of the hollow peripheral cylindrical part of the drum, and the weld connection is to the side face of the drum.

The drive plate (2) is employed to rotationally attach and fix the clutch unit input hub (1) to the drive drum (3). The attachment to the drive drum (3) may be via one or more (e.g. two) retaining (snap) rings for axial fixation and via a spline connection for transferring torque.

The attachment of drive plate (2) to the clutch unit input hub (1) may be by a welded connection An inner clutch end plate (10) is employed to rotationally attach and fix the oil distributor (9) to the inner clutch pack input side (32). The attachment may be via a spline connection at one or both central and peripheral ends of the inner clutch end plate (10). The spline may be provided by an inner clutch drum (11) rotationally fixed (e.g. by welding) to the inner clutch end plate (10). A splined connection avoid welds, allows easier assembly and repair.

The stationary and sliding parts of the inner clutch pack piston are annular structures in connection with the oil distributor (9) via one or more annular seals (e.g. sliding part positioned on lip seal (56), stationary part positioned on O-ring (57)).

The sliding part of the outer clutch pack piston and the stationary part of the balancing chamber (37) of the outer clutch pack piston are annular structures in connection with the oil distributor (9) via one or more annular seals (e.g. sliding part positioned on lip seal (59), stationary part positioned on O-ring (58)). The attachment of the end of the (central) end of the drive drum side face (3*b*) may be attached to the oil distributor (9) using a welded connection.

The outer clutch pack input side (42) may be oriented peripheral to the outer clutch pack output side (44). The inner clutch pack output side (34) is oriented peripheral to the inner clutch pack input side (32). By placing the inner clutch pack input side (32) closer to the central axis and rotationally fixed to the oil distributor (9), it rotates at the same speed as the clutch unit input hub (1). Hence oil is distributed by centrifugal force outwards from the inner clutch pack input side (32) towards the subsequent parts of the clutch including parts of the outer clutch pack (40) even when the inner clutch pack is not engaged. When a vehicle is at standstill, the respective clutch inputs which are both more central than the corresponding clutch outputs are always rotating and hence distributing oil peripherally even when the vehicle is at standstill and the clutch output is not rotating. Hence lubrication is distributed by input-related components in both clutches.

The use of non-welding types of attachment (e.g. spline connection, retaining rings, split rings, O-rings, lip seals) improves the ability to adjust or repair clutches when clutches are tested "not ok" in the tests at the end of line during production.

The outer clutch pack (40) contains a plurality of friction plates (4) intercalated between a plurality of separator plates (6). The separator plates are preferably made of steel. In one configuration, the separator plates (6) are connected to the outer clutch pack input side (42) and the friction plates (4) are connected to the outer clutch pack output side (44). When the outer clutch pack (40) is disengaged, no torque nor speed is transferred from the outer clutch pack input side (42) to the outer clutch pack output side (44). When the outer clutch pack (40) is engaged or slipping torque and speed are transferred from the outer clutch pack input side (42) to the outer clutch pack output side (44) depending on the degree of slipping. One or more springs (5) (e.g. wave springs) may be provided between the separator plates (6) biased to maintain the respective plates open to reduce drag torque. The one or more springs (5) bias the outer clutch pack in a disengaged state.

The drive plate (2) may be configured as an engine side end stop for the outer clutch pack (40). The end stop receives axial forces applied by an outer clutch pack piston (48) to compress the outer clutch pack (40) to engage or slip the clutch.

The inner clutch pack (30) contains a plurality of friction plates (14) intercalated between a plurality of (steel) separator plates (13). In one configuration, the separator plates (13) are connected to the inner clutch pack input side (32) and the friction plates (14) are connected to the inner clutch pack output side (34). When the inner clutch pack (30) is disengaged, no torque nor speed is transferred from the inner clutch pack input side (32) to the inner clutch pack output side (34). When the inner clutch pack (30) is engaged or slipping torque and speed are transferred from the inner clutch pack input side (32) to the inner clutch pack output side (34) depending on the degree of slipping. One or more springs (15) (e.g. return springs) may be provided between the separator plates (6) biased to maintain the respective plates open. The one or more springs (5) bias the inner clutch pack in a disengaged state.

The inner clutch end plate (10) may be configured as an engine side end stop for the inner clutch pack (40). The inner clutch end plate (10) may be further axially fixed in connection to the oil distributor (9). Axial sliding may be limited by a snap ring (29) disposed at the engine side (E) of the inner clutch end plate (10) axially fixed to the oil distributor. The end stop receives axial forces applied by an inner clutch pack piston (38) (see later below) to compress the inner clutch pack (30) to engage or slip the clutch.

The layout of the piston return springs (central and/or in between the plates) allows for accurate opening and closing, as well as reduce drag torque.

The double clutch unit (100) may further comprise an inner clutch pack piston (38) for controllable actuation (engaged, slipping, disengaged) of the inner clutch pack (30). The inner clutch pack piston (38) is axially slidable responsive to expansion or contraction of an inner clutch pack pressure chamber (36). The inner clutch pack pressure chamber (36) is defined by a sliding chamber part (35) of the inner clutch pack piston (38) and an axially stationary part (24). The inner clutch pack pressure chamber (36) contains pressurised hydraulic fluid supplied via the oil-distributor (9). The sliding chamber part (35) and/or axially stationary part (24) may contain a holding space for the pressurised hydraulic fluid. The inner clutch pack piston (38) including the sliding chamber part (35) may be formed from one piece or one or more pieces connected by one or more permanent joints (e.g. welding, bolts). Axial sliding of the axially stationary part (35) relative to the oil-distributor (9) may be limited or prevented by a split ring (27) described later below. The inner clutch pack piston (38) compresses the inner clutch pack (30) thereby controlling clutch engagement, slipping, and disengagement.

The inner clutch pack pressure chamber (36), stationary part (24) and sliding chamber part (35) of the inner clutch pack pressure chamber (36) are annular structures disposed around the oil distributor (9). They are provided in axial direction from engine side (E) to gearbox side (G): sliding chamber part (35), inner clutch pack pressure chamber (36), stationary part (24).

The double clutch unit (100) may further comprise an inner clutch pack piston hydraulic balancing chamber (37). The inner clutch pack piston hydraulic balancing chamber (37) may be defined by the sliding chamber part (35) of the inner clutch pack piston (38) and an axially stationary part (12). The sliding chamber part (35) and/or axially stationary part (12) may contain a holding space for hydraulic fluid. The axially stationary part (12) may be welded to the inner clutch end plate (10) and/or inner clutch drum (11). Axial sliding of the axially stationary part (12) relative to the oil-distributor (9) may be limited or prevented by a snap ring (29) disposed at the engine side (E) of the inner clutch end plate (10) axially fixed to the oil distributor as described elsewhere herein. An annular seal (54) may optionally be disposed between the axially stationary part (12) of the inner clutch pack piston hydraulic balancing chamber (37) and the oil distributor (9). It may be attached to the oil distributor (9). It may be any type of annular seal, including but not limited to an O-ring, vulcanised or lip seal.

Hydraulic fluid is provided to the inner clutch pack piston hydraulic balancing chamber (37) to counter a build-up hydraulic pressure caused by centrifugal forces acting in the inner clutch pack piston pressure chamber (36) that close the inner clutch pack. The hydraulic fluid may be provided under passive pressure to the inner clutch pack piston hydraulic balancing chamber (37).

The inner clutch pack piston hydraulic balancing chamber (37), stationary part (12) and sliding chamber part (35) are annular structures disposed around the oil distributor (9). They are provided in axial direction from engine side (E) to gearbox side (G): axially stationary part (12) of the piston hydraulic balancing chamber (37), piston hydraulic balancing chamber (37), and sliding chamber part (35) of the inner clutch pack piston (38).

The stationary part (24) and sliding chamber part (35) of inner clutch pack pressure chamber (36) may be connected to the oil distributor (9) via one or more annular seals (57, 56). For instance, the sliding chamber part (35) may be positioned on lip seal (56), and the axially stationary part (24) positioned on O-ring (57). One seal (74) (e.g. vulcanised seal) may be disposed between the axially stationary part (24) and sliding chamber part (35) of inner clutch pack pressure chamber (36). One or more seals (72) (e.g. vulcanised seal) may be disposed between the axially stationary part (12) and sliding chamber part (35) of inner clutch pack piston hydraulic balancing chamber (37). Rotation of the inner clutch pack piston (38), sliding chamber part (35) and axially stationary part (24) is essentially synchronised with rotation of the oil distributor (9). Friction between the oil distributor and seals, and between piston rings is sufficient that rotation is essentially synchronised.

The double clutch unit (100) may further comprise an outer clutch pack piston (48) for controllable actuation (engaged, slipping, disengaged) of the outer clutch pack (40). The outer clutch pack piston (48) is axially slidable responsive to expansion or contraction of an outer clutch pack pressure chamber (46). The outer clutch pack pressure chamber (46) is defined by a sliding chamber part (45) of the outer clutch pack piston (48) and an axially stationary part (3b') formed in the side face (3b) of the drive drum (3). The outer clutch pack pressure chamber (46) contains pressurised hydraulic fluid supplied via the oil-distributor (9). The sliding chamber part (45) and/or axially stationary part (3b') may contain a holding space for the pressurised hydraulic fluid. The outer clutch pack piston (48) including the sliding chamber part (45) may be formed from one piece or one or more pieces connected by one or more permanent joints (e.g. welding, bolts). Axial sliding of the axially stationary part (3b') relative to the oil-distributor (9) is prevented by the welded connection of the drive drum (3) to the oil-distributor (9). The outer clutch pack piston (48) is assembled by axial sliding the sliding chamber part (45) into the cylindrical space formed by the axially stationary part (3b') formed in the side face (3b) of the drive drum (3).

The outer clutch pack piston pressure chamber (46) is sealed peripherally by an annular seal (55) (e.g. vulcanised seal, optionally provided in a groove) on the sliding chamber part (45) of the outer clutch pack piston (48) that seals against the axially stationary part (3b') formed in the side face (3b) of the drive drum (3). A seal (55) on the sliding chamber part (45) allows for easier assembly by slidable insertion. It avoids a need for a separate inwardly protruding part to be welded to the drive drum for attachment of and axial placement of a seal that some prior art designs use. The outer clutch pack piston pressure chamber (46) is sealed centrally by a seal (59) (e.g. lip seal, optionally provided in a groove) on the oil distributor (9). This also allows for ease of assembly by slidable insertion. Hence, the axially stationary part (3b') and sealing arrangement both seals (55, 59) reduce complexity of design.

The outer clutch pack pressure chamber (46) and sliding chamber part (45) of the outer clutch pack pressure chamber (46) are annular structures disposed around the oil distributor (9). They are provided in axial direction from engine side (E) to gearbox side (G): sliding chamber part (45), outer clutch pack pressure chamber (36) and axially stationary part (3b') formed in the side face (3b) of the drive drum (3). The outer clutch pack piston (48) compresses the outer clutch pack (40) thereby controlling clutch engagement, slipping, and disengagement.

The double clutch unit (100) may further comprise an outer clutch pack piston hydraulic balancing chamber (47). The outer clutch pack piston hydraulic balancing chamber (47) may be defined by the sliding chamber part (45) of the outer clutch pack piston (48) and an axially stationary part (23). The axially stationary part (23) may be disposed to the engine side of the sliding chamber part (45). The sliding chamber part (45) and/or axially stationary part (23) may contain a holding space for the hydraulic fluid. Axial sliding of the axially stationary part (23) relative to the oil-distributor (9) is limited or prevented by a split ring (27) described later below. The outer clutch pack piston hydraulic balancing chamber (47) may comprise a spring pack (20) to bias the outer clutch pack piston hydraulic balancing chamber (47) in an open position. The spring pack (20) is preferably a coil spring. Including a coil spring pack (20) within the balancing chamber (47) brings a reduction in friction/hysteresis compared to a large disc spring that is often employed in other designs.

Hydraulic fluid is provided to the outer clutch pack piston hydraulic balancing chamber (47) to counter a build-up hydraulic pressure caused by centrifugal forces acting in the outer clutch pack piston pressure chamber (46) that close the outer clutch pack. The hydraulic fluid may be provided under passive pressure to the outer clutch pack piston hydraulic balancing chamber (47).

The outer clutch pack piston hydraulic balancing chamber (47), sliding chamber part (45) and axially stationary part (23) are annular structures disposed around the oil distributor (9). They are provided in axial direction from engine side (E) to gearbox side (G): axially stationary part (23), piston hydraulic balancing chamber (47), and sliding chamber part (45) of the outer clutch pack piston (48).

The axially stationary part (23) of the outer clutch pack piston hydraulic balancing chamber (47), and sliding chamber part (45) of outer clutch pack pressure chamber (36) may be connected to the oil distributor (9) via one or more annular seals (58, 59). For instance, the sliding chamber part (45) may be positioned on lip seal (58), and the axially stationary part (23) positioned on O-ring (59). One or more seals (76) (e.g. a vulcanized seal) may be disposed between the axially stationary part (23) and sliding chamber part (45) of outer clutch pack piston hydraulic balancing chamber (47). Rotation of the outer clutch pack piston (48), sliding chamber part (45) and axially stationary part (23) is essentially synchronised with rotation of the oil distributor (9). Friction between the oil distributor and seals, and between pistons and seals is sufficient that rotation is essentially synchronised.

The side face (3b) of the drive drum (3) may be disposed at gearbox side of both the inner clutch pack piston (38) and outer clutch pack piston (48).

The axially slidable inner clutch pack piston (38) may be disposed on the engine side of the axially slidable outer clutch pack piston (48).

The split ring (27) axially fixed around the oil distributor (9) to limit an axial sliding motion of the stationary part (24) of the inner clutch pack pressure chamber (36), and the split ring (27) to limit axial sliding motion of the stationary part (23) of the outer clutch pack piston hydraulic balancing chamber (47), may be one and the same. The split ring (27) may be disposed between the stationary part (24) of the inner clutch pack pressure chamber (36) and the axially stationary part (23) of the outer clutch pack piston hydraulic balancing chamber (47).

The provision of the split ring (27) obviates the need for welding during the assembly operations; it reduces industrialisation effort and also increases the reparability/maintainability of the clutch.

The axially stationary parts (23) and (24) are not welded to the oil distributor (9) but are each mounted on an O-ring (57, 58) and separated by the split ring (27) that limits axial movement; this ensures an ease of assembly and disassembly. Axially fixing axially stationary parts (23) and (24) is used to reduce cross talk between the clutches.

By positioning the pressure chamber of the inner clutch piston next to the outer clutch hydraulic balancing chamber, the design of the clutch is more compact axially. The split ring (27) may be disposed abutting a shoulder on the stationary part of the outer clutch hydraulic balancing chamber.

The double clutch (100) may further comprise a stator (60). The stator (60) is a non-moving part of the double clutch. The oil distributor (9), clutch packs (30, 40), plates (7, 10), pistons rotate relative to the stator (60). The stator (60) comprises one or more channels for the passage of oil to the oil-distributor (9). The oil distributor (9) may be disposed concentrically around the outside of the stator (60). The clutch unit outer power output shaft (70) may be disposed concentrically within the stator (60).

The oil distributor (9) contains a plurality of channels for the distribution of oil within the double clutch unit (100) for lubrication, cooling and hydraulic pressure. Channels in the oil distributor are in connection with the stator and oil is directed via the stator and oil distributor into the clutch unit for lubrication, and for operation of the hydraulic chambers. Sealing of the oil channels between the non-moving stator (60) and the rotating oil distributor (9) is ensured with one or more piston rings.

The drive plate (2) may be dismountably attached to the drive drum (3), preferably by one or more retaining rings, preferably wherein two retaining rings flank the drive plate (2). The retaining rings dismountably attach to the drive drum (3). Preferably drive plate (2) may be dismountably attached to the drive drum (3) by an engine side (flat) retaining ring (31a) (e.g. flat ring) and by a gearbox side retaining ring (31b) (e.g. Belleville (conical spring)). The drive plate (2) may be axially slidably fixed by the flanking retaining rings. The double snap ring design reduces industrialisation effort and increases the reparability and maintainability; other designs that weld the drive plate to the drive drum cannot be serviced or repaired and would be discarded in case of failure.

The drive plate (2) may be further dismountably attached to the drive drum (3) via a spline connection for transferring torque. The drive plate (2) may be provided with an external spline, the drive drum (3) hollow peripheral cylindrical part (3a) may be provided with a complementary internal spline.

The drive plate (2) may be configured as an (engine side) end stop (2') for the outer clutch pack (40). The end stop receives axial forces applied by the outer clutch pack piston (48) to compress the outer clutch pack (40). In particular, a portion of the drive plate (2) provided with said engine side end stop (2') may be formed as a projection (e.g. bent protrusion) in a wall of the drive plate (2) in the direction of the gear box (G). The position of the end stop (2') may be at an optimum location between the inner and outer diameter of the outer clutch pack (40) for receipt compression forces.

With the end stop (2') formed in the drive plate (2) as bent protrusion for the outer clutch pack (40), the reaction force is central between inner and outer clutch plate diameter. In other designs (e.g. DE 10 2005 045158 (A1)), the reaction force passes onto a snap ring via a very thick reaction plate; that plate would need to be thick to ensure it is stiff enough and will not bend in particular because the load from the clutch pack is not in line with the reaction load by the snap ring, causing bending moment. If that plate would bend, the clutch plates would not be uniformly loaded and will suffer increased wear. The additional weight and inertia of that thick reaction plate in prior art designs is not favourable.

The engine side retaining ring (31a) and gearbox-side retaining ring (31b) flanking an outer edge of the drive plate (2) secure the axial position of the outer clutch when the outer clutch is open. The engine side retaining ring (31a) takes the full clutch load when clutch is closed. The gearbox-side retaining ring (31b) keeps the drive plate (2) at its axial position when opening the clutch. The layout with these retaining rings (31a, 31b), again enables assembly or disassembly of the drive plate (2) for shimming or repair purposes.

Shimming is a correction of the clutch travel (difference in axial position between open and closed clutch) for the dimensional tolerances of the clutch parts; the travel can be adjusted on the outer clutch (28) and the inner clutch (29) by the use of shim plates (82, 84). The shim plates can be added or taken away from the engine side of the clutch pack with ease, because the parts of the clutch to the engine side of the drive drum are not welded.

Example

Figure 2:
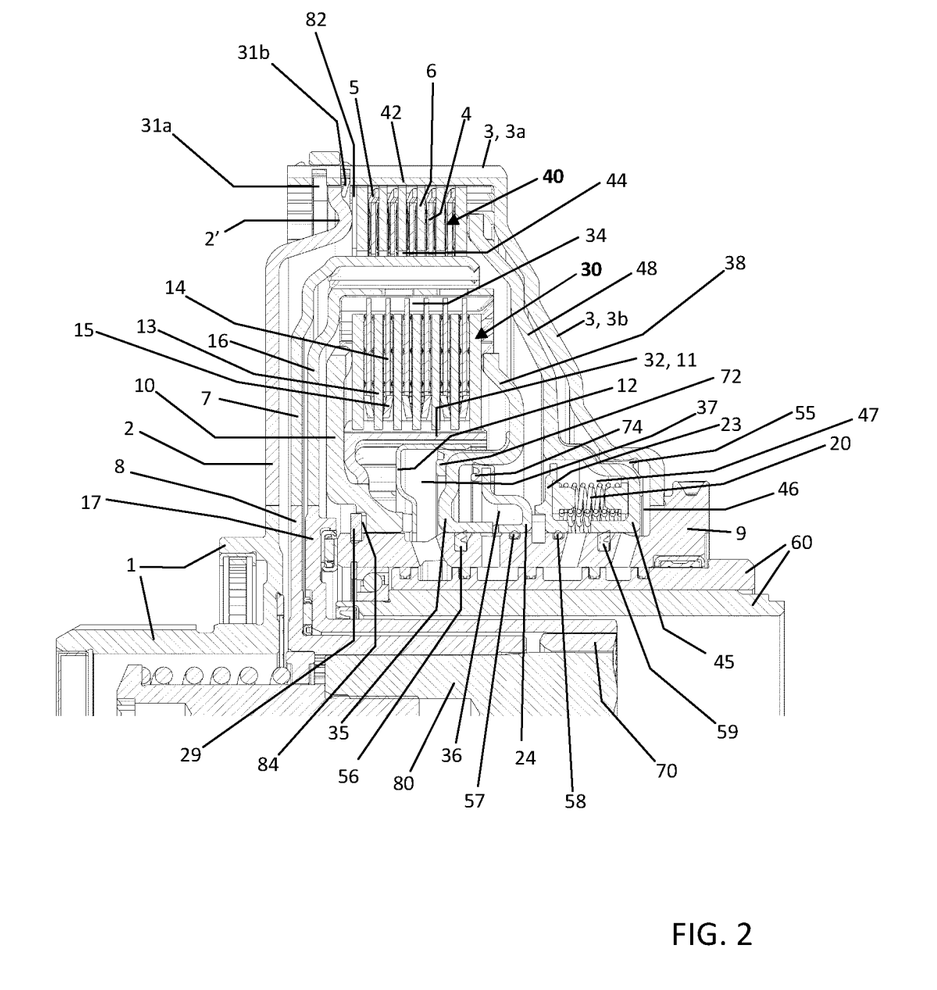
FIG. 2 provides a cross-sectional view of a schematic a double clutch unit (100) for a transmission as described herein. Shown is an axial cross section and the upper half; the lower half is a mirror image.

Lay-out is presented in FIG. 2 of a double clutch (100) having of two concentric multi plate wet clutch packs (30, 40) that are operated separately by applying hydraulic pressure to two pistons.

At the clutch input (engine side), an interface with the engine/flywheel is by a spline on the input hub (1) that is welded to the drive plate (2). The drive plate (2) transfers the power to the drive drum (3) also via a spline connection. The drive plate (2) is also in direct contact with the outer clutch pack input side (42) and serves as an axial end stop for the outer clutch pack (40). The outer clutch pack (40) contains a plurality of friction plates (4), wave springs (5) and steel separator plates (6). In this outer clutch pack (40), the separator plates (6) are connected via a spline to the input side (42) (drive drum (3)) and the friction plates (4) are connected to the output side (44) via (the outer clutch output drum (7)) that is welded to the clutch unit inner output hub (8). This output hub (8) is the interface for the inner drive shaft of the gear box for the odd gears.

The resulting power flow path for the odd gears is via the input hub (1) and drive plate (2) welded assembly, the drive drum (3), the outer clutch pack (40) input side (42), the outer clutch pack (40) output side (44), the outer clutch output drum (7), and clutch unit inner output hub (8). This is visualized in FIG. 3.

Figure 3:
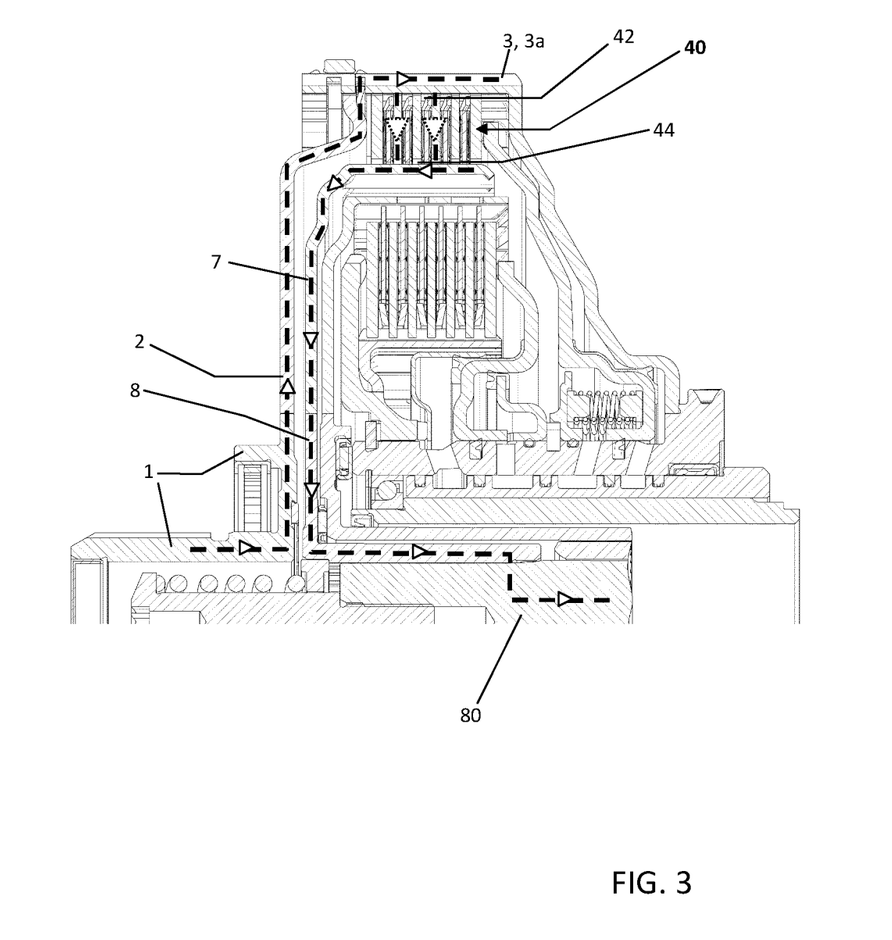
FIG. 3 provides a cross-sectional view of a schematic a double clutch unit (100) for a transmission as described herein of FIG. 2 which power flow into and out of the outer clutch pack is indicated.

The drive drum (3) is welded to the oil distributor (9). This oil distributor (9) will transfer the engine power via a spline to the inner clutch end plate (10). This inner clutch end plate (10) is welded to the inner clutch drum (11) and the axially stationary part (12) of the inner clutch pack piston hydraulic balancing chamber (37).

The welded assembly (10-11-12) will serve as both the input driver for power to the inner clutch pack (30) via the inner clutch end plate (10) and the inner clutch drum (11) and as the axial end stop via the inner clutch end plate (10). The inner clutch pack (30) contains of separator plates (13), friction plates (14) and return springs (15). In the inner clutch pack (30), the separator plates (13) are connected via a spline to the input side (inner clutch drum (11)) and the friction plates (14) are connected to the output side via the inner clutch output drum (16) that is welded to the clutch unit outer output hub (17). This clutch unit outer output hub (17) is the interface for the outer drive shaft of the gear box for the even and reverse gears.

The resulting power flow path for the even and reverse gears is via the input hub (1), drive plate (2), drive drum (3), oil distributor (9), inner clutch end plate (10) (and the inner clutch drum (11)), the inner clutch pack (30) input side (32), the inner clutch pack (30) output side (34), inner clutch output drum (16), clutch unit outer output hub (17). This is visualized in FIG. 4.

Figure 4:
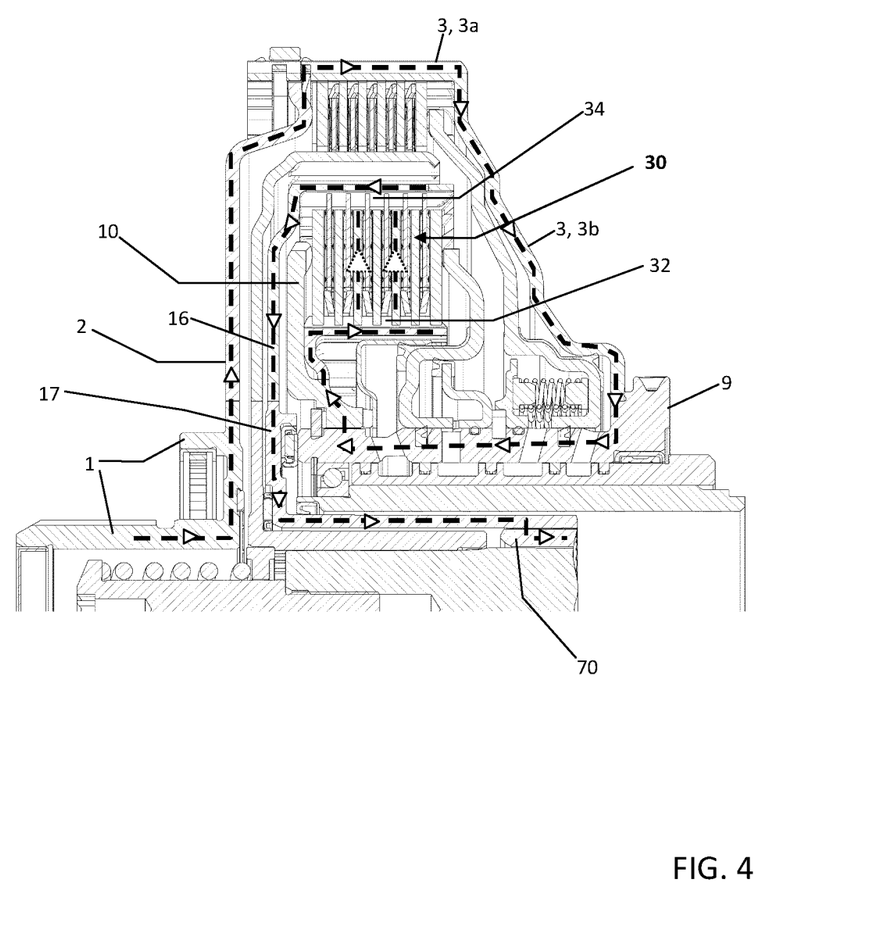
FIG. 4 provides a cross-sectional view of a schematic a double clutch unit (100) for a transmission as described herein of FIG. 2 which power flow into and out of the inner clutch pack is indicated.

A side-effect of the above power flow is that the oil distributor (9) is always connected to the input (engine side) independent of the operation of the clutches. As a consequence a pump gear can be integrated on the oil distributor at the gearbox side of the clutch. This allows for a hydraulic pump drive via the combustion engine inside the gearbox.

The oil distributor (9) distributes the oil from the central stator (60) to the outer clutch pack piston pressure chamber (46) to actuate the outer clutch pack piston (48). By putting hydraulic pressure in the pressure chamber (46) the outer clutch pack piston (48) will close the outer clutch pack (40) and permit torque and speed to be transferred via the power flow path as described above for the odd gears. The outer clutch pack piston pressure chamber (46) is sealed by a vulcanized seal (55) on the outer clutch pack piston (48) and a lip seal (59) in a groove in the oil distributor. For opening of the outer clutch pack (40), the spring pack (20) is used for the piston return. For lowering drag torque and improving consistency in the clutch behaviour, extra wave springs (5) are introduced in the outer clutch pack (40). These wave springs ensure that plates are well separated when the outer clutch pack is open. A spring pack (20) is located in the hydraulic balancing chamber (outer clutch pack piston) (47). This hydraulic balancing chamber (47) is sealed by the axially stationary part (23) with vulcanized seal (55), O-ring (58) and lip seal (59).

For the operation of the inner clutch pack (30), the oil is also supplied via the stator (60) and oil distributor (9) to the inner clutch pack pressure chamber (36) to actuate the inner clutch pack piston (38). By putting hydraulic pressure in the pressure chamber (36) the inner clutch pack piston (38) will close the inner clutch pack (30) and permit torque and speed to be transferred via the power flow path as described above for the even and reverse gears. The inner clutch pack pressure chamber (36) is sealed by a vulcanized seal (74) on the stationary part (24), O ring (57) and lip seal (56) in a groove in the oil distributor (9). For opening of the inner clutch pack (30), disc springs (15) are used for the piston return. These return disc springs will also ensure that plates are well separated when the inner clutch pack is open and as such lower the drag torque.

The invention claimed is:

1. A double clutch unit for a transmission, having an engine side and a gearbox side comprising:
   a clutch unit input hub,
   a clutch unit outer output hub and an clutch unit inner output hub concentrically arranged,
   an outer clutch pack and an inner clutch pack, each having a clutch pack input side and a clutch pack output side, wherein
       the outer clutch pack output side is rotationally fixed to the clutch unit inner output hub;
       the inner clutch pack output side rotationally fixed to the clutch unit outer output hub;
   a drive plate disposed on the engine side of both clutch packs rotationally fixed to the clutch unit input hub;
   an oil distributor is disposed concentrically between the inner clutch pack and the clutch unit outer output hub;
   a drive drum, having
       a hollow peripheral cylindrical part extending axially over the outer clutch pack, and
       a side face extending over the gearbox side of both clutch packs to the oil distributor and rotationally fixed the hollow peripheral cylindrical part,
       an inner clutch end plate is rotationally fixed to the oil distributor and to the inner clutch input side;
   wherein the drive plate, the drive drum, the oil distributor, and the inner clutch end plate are mutually rotationally fixed;
   wherein torque is transferred from the clutch unit input hub to the outer clutch pack input side via a power flow path from the input hub, to drive plate, to drive drum to outer clutch pack input side,
   wherein torque is transferred from the clutch unit input hub to the inner clutch pack input side via a power flow path from the input hub, to drive plate, to drive drum, to oil distributor, to inner clutch end plate, to inner clutch pack input side
   wherein,
       the outer clutch pack input side is oriented peripheral to the outer clutch pack output side, and
       the inner clutch pack output side is oriented peripheral to the inner clutch pack input side.

2. The double clutch unit according to claim 1 further comprising:
   an inner clutch pack piston configured for controllable actuation of the inner clutch pack,
   an outer clutch pack piston configured for controllable actuation of the outer clutch pack,
   wherein the side face of the drive drum is disposed at gearbox side of both the inner clutch pack piston and outer clutch pack piston, and/or wherein the inner clutch pack piston is disposed on the engine side of the outer clutch pack piston.

3. The double clutch unit according to claim 2, wherein
   the outer clutch pack piston is axially slidable responsive to expansion or contraction of an outer clutch pack pressure chamber,
   the outer clutch pack pressure chamber is defined by a sliding chamber part of the outer clutch pack piston and an axially stationary part formed in the side face of the drive drum, and
   wherein the sliding chamber part is sealed against the axially stationary part by an annular seal disposed, optionally in a groove, around the sliding chamber part.

4. The double clutch unit according to claim 3, further comprising an outer clutch pack piston hydraulic balancing chamber wherein:
   the outer clutch pack piston hydraulic balancing chamber is defined by the sliding chamber part of the outer clutch pack piston and an axially stationary part;
   hydraulic fluid is provided to the outer clutch pack piston hydraulic balancing chamber to counter a build-up of hydraulic pressure caused by centrifugal forces acting in the outer clutch pack piston pressure chamber to close the outer clutch pack; and
   optionally the outer clutch pack piston hydraulic balancing chamber comprises a spring pack to bias the outer clutch pack piston hydraulic balancing chamber in an open position.

5. The double clutch unit according to claim 4, wherein
   the inner clutch pack piston is axially slidable responsive to expansion or contraction of an inner clutch pack pressure chamber, and
   the inner clutch pack pressure chamber is defined by a sliding chamber part of the inner clutch pack piston and an axially stationary part.

6. The double clutch unit according to claim 5, further comprising an inner clutch pack piston hydraulic balancing chamber wherein:
   the inner clutch pack piston hydraulic balancing chamber is defined by the sliding chamber part of the inner clutch pack piston and an axially stationary part, and
   hydraulic fluid is provided to the inner clutch pack piston hydraulic balancing chamber to counter a build-up of hydraulic pressure caused by centrifugal forces acting in the inner clutch pack piston pressure chamber to close the inner clutch pack.

7. The double clutch unit according to claim 5, further comprising a split ring axially fixed around the oil distributor between the stationary part of the inner clutch pack pressure chamber and the stationary part of the outer clutch pack piston hydraulic balancing chamber configured to limit:
   an axial sliding motion of the stationary part of the inner clutch pack pressure chamber, and
   an axial sliding motion of the stationary part of the outer clutch pack piston hydraulic balancing chamber.

8. The double clutch unit according to claim 3, wherein
   the inner clutch pack piston is axially slidable responsive to expansion or contraction of an inner clutch pack pressure chamber, and
   the inner clutch pack pressure chamber is defined by a sliding chamber part of the inner clutch pack piston and an axially stationary part.

9. The double clutch unit according to claim 8, further comprising an inner clutch pack piston hydraulic balancing chamber wherein:
   the inner clutch pack piston hydraulic balancing chamber is defined by the sliding chamber part of the inner clutch pack piston and an axially stationary part, and hydraulic fluid is provided to the inner clutch pack piston hydraulic balancing chamber to counter a build-up of hydraulic pressure caused by centrifugal forces acting in the inner clutch pack piston pressure chamber to close the inner clutch pack.

10. The double clutch unit according to claim 8, further comprising a split ring axially fixed around the oil distributor between the stationary part of the inner clutch pack pressure chamber and the stationary part of the outer clutch pack piston hydraulic balancing chamber configured to limit:
   an axial sliding motion of the stationary part of the inner clutch pack pressure chamber, and
   an axial sliding motion of the stationary part of the outer clutch pack piston hydraulic balancing chamber.

11. The double clutch unit according to claim 2, wherein the inner clutch pack piston is axially slidable responsive to expansion or contraction of an inner clutch pack pressure chamber, and
   the inner clutch pack pressure chamber is defined by a sliding chamber part of the inner clutch pack piston and an axially stationary part.

12. The double clutch unit according to claim 11, further comprising an inner clutch pack piston hydraulic balancing chamber wherein:
   the inner clutch pack piston hydraulic balancing chamber is defined by the sliding chamber part of the inner clutch pack piston and an axially stationary part, and
   hydraulic fluid is provided to the inner clutch pack piston hydraulic balancing chamber to counter a build-up of hydraulic pressure caused by centrifugal forces acting in the inner clutch pack piston pressure chamber to close the inner clutch pack.

13. The double clutch unit according to claim 12, further comprising a split ring axially fixed around the oil distributor between the stationary part of the inner clutch pack pressure chamber and the stationary part of the outer clutch pack piston hydraulic balancing chamber configured to limit:
   an axial sliding motion of the stationary part of the inner clutch pack pressure chamber, and
   an axial sliding motion of the stationary part of the outer clutch pack piston hydraulic balancing chamber.

14. The double clutch unit according to claim 11, further comprising a split ring axially fixed around the oil distributor between the stationary part of the inner clutch pack pressure chamber and the stationary part of the outer clutch pack piston hydraulic balancing chamber configured to limit:
   an axial sliding motion of the stationary part of the inner clutch pack pressure chamber, and
   an axial sliding motion of the stationary part of the outer clutch pack piston hydraulic balancing chamber.

15. The double clutch unit according to claim 1, wherein at least one clutch pack comprises one or more springs, preferably wave springs and/or disk springs, configured to maintain clutch plates within the clutch pack separated such that the clutch pack is biased in a disengaged state to reduce drag torque in open clutch.

16. The double clutch unit according to claim 1, wherein the drive plate is dismountably attached to the drive drum by a spline connection, and by an engine side retaining ring and by a gearbox side retaining ring each retaining ring dismountably attached to the drive drum to limit axial movement of the drive plate.

17. The double clutch unit according to claim 16, wherein the drive plate is configured as an engine side end stop for the outer clutch pack that receives axial forces applied by the outer clutch pack piston plate to compress the outer clutch pack.

18. The double clutch unit according to claim 1, further comprising an outer clutch output drum configured to rotationally attach and fix the outer clutch pack output side to the clutch unit inner output hub by one or more spline connections to the outer clutch pack output side and by a welded connection to the clutch unit inner output hub.

19. The double clutch unit according to claim 1, further comprising an inner clutch output drum configured to rotationally attach and fix the inner clutch pack output side to the clutch unit outer output hub by one or more spline connections to the inner clutch pack output side and by a welded connection to the clutch unit outer output hub.

20. The double clutch unit according to claim 19, wherein the inner clutch end plate is attached to:
   the oil distributor by one or more spline connections, and
   the inner clutch pack input side by one or more spline connections.

* * * * *